July 23, 1935.  C. G. FALKNER  2,008,856

CASH REGISTER

Filed Nov. 7, 1931  2 Sheets-Sheet 1

Inventor
Carl G. Falkner
By
Carl Beust
His Attorney

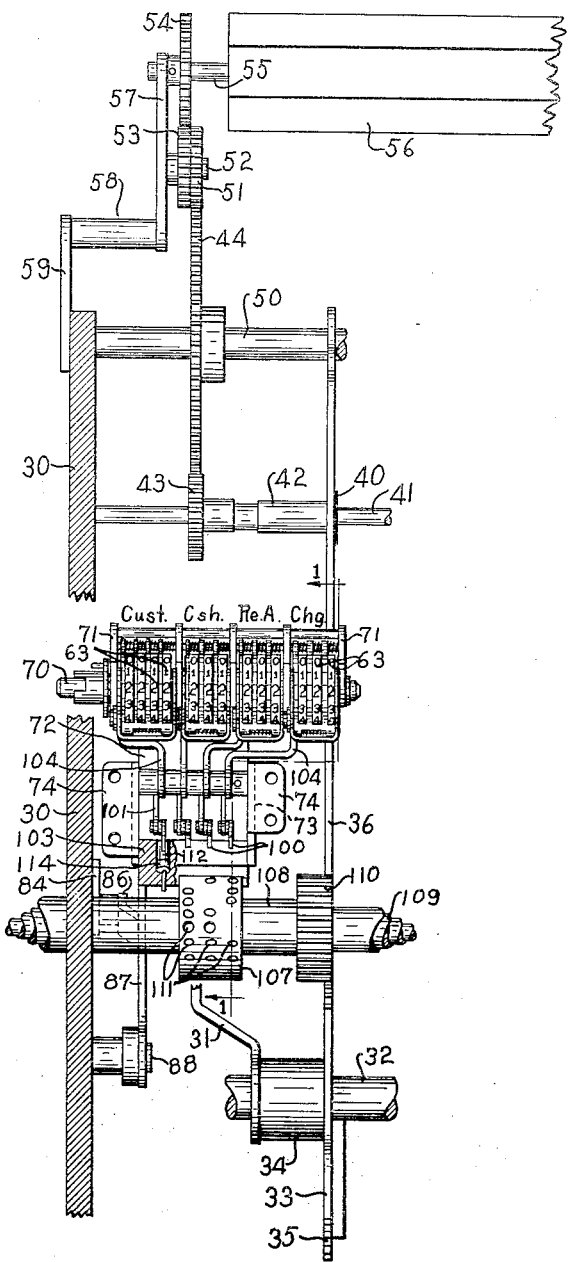

Patented July 23, 1935

2,008,856

UNITED STATES PATENT OFFICE 2,008,856

CASH REGISTER

Carl G. Falkner, Dayton, Ohio, assignor to The National Cash Register Company, Dayton, Ohio, a corporation of Maryland Application November 7, 1931, Serial No. 573,664

5 Claims. (Cl. 235—6)

This invention relates to improvements in cash registers and the like, and more particularly refers to improvements in step-by-step counters for such machines.

The machine chosen to illustrate the instant invention is of the type fully disclosed in Letters Patent of the United States to B. M. Shipley, No. 1,360,151, issued November 23, 1920.

Machines of the type disclosed in the above mentioned patent are usually provided with a plurality of rows or banks of amount keys to control the machines to accumulate amounts, a row of clerks' keys to control the printing of symbols indicating the identity of the particular clerk who was responsible for the transaction, and a row of transaction keys to control the printing and indicating of characters representing the nature of the transactions. The last mentioned keys, that is, the transactions, also control individual step-by-step counters, the purpose of which counters is to count the number of each kind of transaction entered into the machine. The step-by-step counters disclosed in the above mentioned patent are controlled by their corresponding transaction keys. Thus, the "Cash" key controls the cash counter, the "Charge" key controls the charge counter, etc. However, it sometimes happens that it is desired that two or more keys in different locations in the same row of keys control the same counter to add one upon operation of the machine.

The primary object of the instant invention, therefore, is to provide a machine of the type indicated, with a flexible step-by-step counter selecting means.

Another object is, by the elimination of parts, to provide a more compact counter operating means.

Still another object is to provide counter selecting mechanism wherein a rotatable drum having a plurality of holes in the peripherial surface thereof, coacts with a series of plungers, simultaneously to select one or more of the plurality of step-by-step counters.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 3 is a view in front elevation of the counters, their selecting mechanism, and their operating mechanism.

Figures 1, 2:
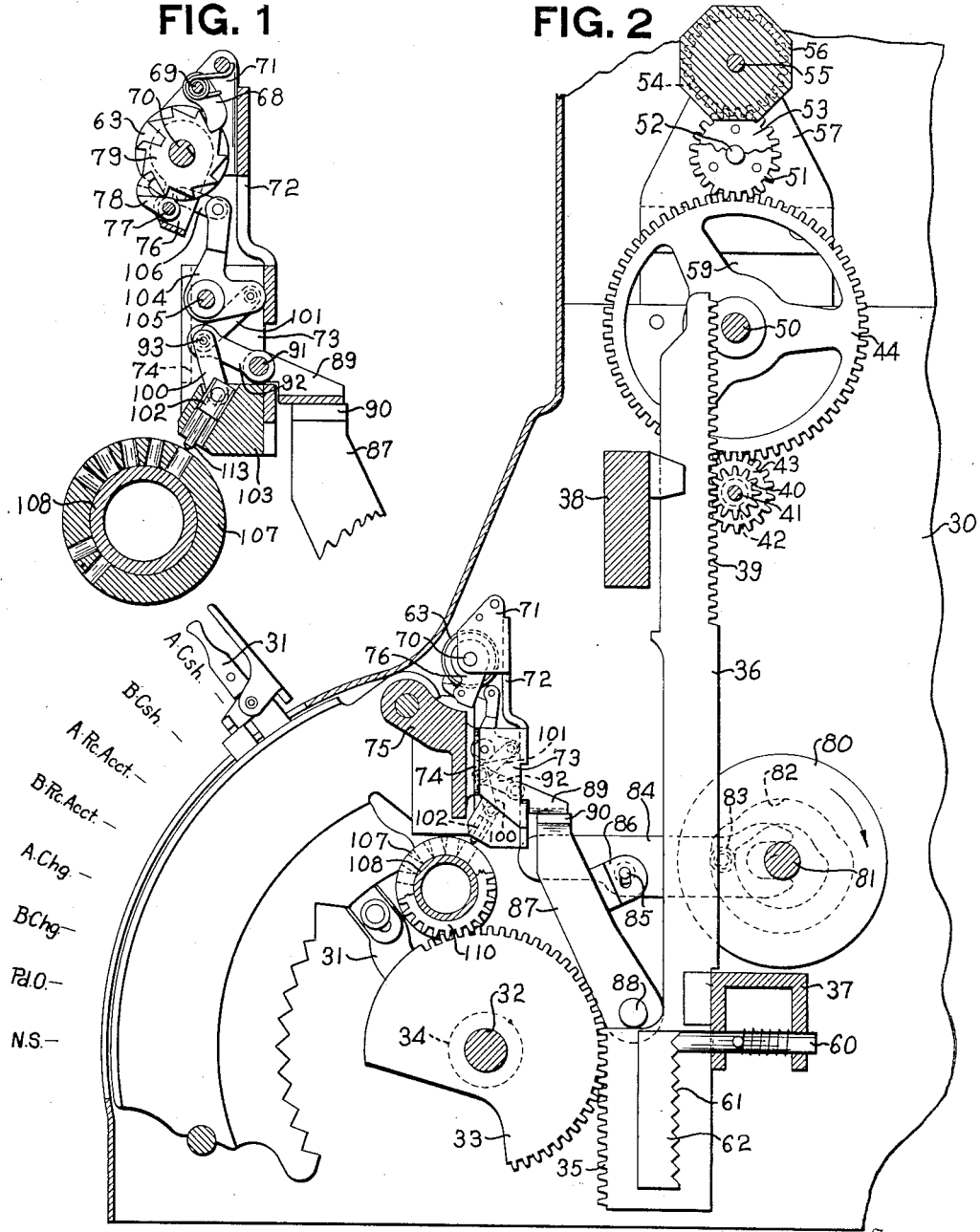
Fig. 1 is a sectional view taken on line 1—1, Fig. 3, showing the operating mechanism for one of the step-by-step counters.
Fig. 2 is a sectional view to the right of the counter showing the selecting mechanism and the operating mechanism therefor.

Described in general terms, the present invention includes a plurality of step-by-step counters, mounted on a common shaft provided with a common operating means.

In order to select a particular counter or counters for operation, a rotatable selecting drum is provided. This drum has a plurality of series of control points comprising radial holes and unbroken points in its periphery, which control points are adapted to be brought into cooperative relation with a series of plungers, one for each counter, to select a counter or counters for operation.

The selecting drum is rotated differentially by a manipulative device according to the position to which the manipulative device is set. The common operating means then functions to move the plungers in the direction of the control point, those plungers finding holes, preventing operation of the respective counters, and those plungers finding the unbroken periphery of the selecting drum causing operation of their associated counters. A detailed description of the mechanism will now be given.

The mechanism comprising the machine chosen to illustrate this invention is supported between two side frames 30 (Figs. 2 and 3), only one of which is shown herein. A manipulative lever 31 is rotatably mounted on a shaft 32, supported in the frames 30, said lever being rigidly connected by a hub 34 to a segment gear 33, mounted on the shaft 32. The segment gear 33 meshes with a rack 35 carried on the lower end of a vertically disposed indicator setting bar 36, mounted to slide vertically in a groove in a channel cross-bar 37 supported by the frames 30 and in a groove in an upper cross-bar 38, also supported between the frames 30. A rack 39 on the upper rear edge of the setting bar 36 meshes with a gear 40, rotatably mounted on a shaft 41 supported by the frames 30, which gear 40 is connected by a hub 42 to a gear 43, also rotatably mounted on the shaft 41. The gear 43 meshes with a large intermediate gear 44 rotatably mounted on a shaft 50 supported by the frames 30, which gear 44 meshes with a gear 51 rotatably mounted on a stud 52 supported by the brackets 57. The gear 51 is secured to the side of a gear 53 also mounted on the stud 52. The gear 53 in turn meshes with a gear 54 secured to an indicator shaft 55, to which shaft is also secured an indicator 56.

The indicator shaft 55 is rotatably supported in a bracket 57, secured by studs 58 to a bracket 59, which in turn is secured to the side of the frame 30. The shaft 55 is similarly supported at the opposite end of the machine (not shown). The bracket 57 also supports the stud 52, upon which the gears 51 and 53 are mounted.

Obviously, counter-clockwise (Fig. 2) movement of the lever 31 to one of its several positions correspondingly rotates the segment 33, thus raising the bar 39. This rotates the gears 40 and 43 clockwise, rotating the gear 44 counter-clockwise. Counter-clockwise rotation of the gear 44 rotates the gears 51 and 53 clockwise, which in turn rotates the gear 54, shaft 55, and the indicator 56, counter-clockwise, setting the indicator to a position corresponding to the position to which the lever 31 is set. A spring-pressed aliner 60 cooperates with a series of notches 61 on a bar 62 secured to the side of the bar 36 to aline and hold the bar 36 and the mechanism adjusted thereby in the position to which it is adjusted.

The lever 31 and the mechanism operated thereby has no home or zero position, but is moved directly to its new position from the position in which it was last left.

The several positions of the lever 31, of which there are eight in the machine disclosed herein, represents three different classifications of transactions, namely, Cash transactions, Received-on-account transactions, and the transactions wherein money is paid out.

In addition to setting the indicator 56 to indicate the kind of transaction, the lever 31 also sets a type wheel (not shown herein, but fully disclosed in the above mentioned Shipley patent) to print characters indicating the kind of transaction entered in the machine. Thus, when the lever 31 is set to "A—Received-on-account" position, the type wheel (not shown), may be set to bring a similar character thereon to the printing position.

Reading counter-clockwise from the position in which the lever 31 appears in Fig. 2, the position of said lever may be "A—Cash", "B—Cash", "A—Received-on-account", "B—Received-on-account", "A—Charge", "B—Charge", "Paid-out" and "No-sale". The movement of the lever 31 also selects the step-by-step counter for operation, as will be described later.

There are four step-by-step counters provided in the illustrative embodiment of the instant invention. It is to be understood, however, that additional counters may be provided and selected by slight mechanical changes without departing from the spirit of the invention.

As viewed in Fig. 3, the step-by-step counters, from left to right, are as follows: the "Customer" counter, which counter is operated at each operation of the machine to register the total number of times the machine is operated, the "Cash" counter, operated under the control of the lever 31 when said lever is set to either of the "Cash" positions to register the total number of cash sales, the "Received-on-account" counter operated under the control of the lever 31, when said lever is set to one of the received-on-account positions to register the total number of received-on-account transactions, and on the extreme right is located the "Charge" counter, which is operated under the control of the lever 31 when said lever is set to one of the charge positions, to register the total number of charge transactions.

The counters are of a conventional type, and each counter, except the "Customer" counter, is provided with three counter wheels in each group. Since the "Customer" counter operates at each operation of the machine, it requires a greater capacity than the other three counters, for which reason it is provided with four counter wheels 63, identical with the counter wheels 63 for the "Cash", "Received-on-Account" and "Charge" counters.

The counter wheels 63 are rotatably mounted on a common shaft 70, rotatably mounted in plates 71, bent forwardly at right angles from the side of a bracket 72. The sides 73, bent forwardly from the lower end of the bracket 72, have feet 74 adapted to be secured to the right-hand side (Fig. 2) of a cross-bar 75 supported between the side frames 30, only one of which is shown herein. Since the corresponding elements of these counters are alike, only one of said counters will be described. Like reference numerals are applied to like parts on each of the counters.

Each of the groups of counter wheels 63 is embraced by a pair of yoked arms 76 (Figs. 1 and 3) loosely mounted on the shaft 70. Each pair of yoked arms 76 carry a short rod 77 on which is mounted a spring-pressed, tined pawl 78, the tines of which pawl cooperate with ratchet wheels 79, one secured to the side of each of the counter wheels 63. In order to prevent retrograde movement of the counter wheels, spring-pressed retaining pawls 68 mounted on a rod 69, supported between the plates 71, cooperate with the ratchet wheels 79.

The arms 76 associated with the particular counter to be operated are rocked first clockwise (Fig. 1), and then counter-clockwise to normal to add "1" on the selected counter. At the clockwise movement of the arm 76, the tined pawl 78, cooperating with a notch in the ratchet wheel 79, rotates said wheel one step, carrying therewith the counter wheel secured thereto.

The mechanism for operating the yoked arm 76 includes a cam 80 secured on a drive shaft 81 rotatably mounted in the frames 30, and operated by any suitable means, none, therefore, being illustrated. A cam groove 82 in the cam 80 embraces an anti-friction roller 83 on a pitman 84, the right-hand end (Fig. 2) of which is bifurcated to slide on the shaft 81. A stud 85 carried on the pitman 84 projects through a slot in an ear 86 on a lever 87 pivoted on a stud 88 in the frame 30.

A bracket 89 is secured to an ear 90 of the lever 87, and is bent at right angles thereto. The ends of the bracket 89 are bent upwardly and carry therebetween a bail 91 on which is pivoted a series of links 92, there being a link 92 for each step-by-step counter. The other ends of the links 92 are pivoted on studs 93 pivotally joining pairs of toggle links 100 and 101. The lower end of each of the links 100 is pivotally connected with a plunger 102 slidably mounted in a hole in a block 103, supported by the bracket 72. The upper ends of the links 101 are connected to one arm of a bell crank 104 pivoted on a rod 105 supported by the sides 73 of the bracket 72. A link 106 connects the other arm of the bell crank 104 to one of the yoke arms 76.

It is to be understood that there is provided a link 92, a pair of toggle links 100 and 101, a bell crank 104, and a plunger 102 for each step-by-step counter in the machine.

The configuration of the cam groove 82 is such that at the proper time during each rotation of the drive shaft 81, and consequently of the cam 80, it draws the pitman 84 toward the right, rocking the lever 87 clockwise, and then restores the pitman 84 toward the left, rocking the lever 87 counterclockwise to normal position. The clockwise movement of the lever 87, acting through the link 92, straightens the toggle links 100 and 101. Obviously, if a plunger 102 is held against movement, the straightening of the toggle links 100 and 101 will rock the bell crank 104 counter-clockwise and, by the link 106, rock the yoke arms 76 and pawl 78 clockwise, adding "1" on the counter wheel 63 of lowest order for that particular counter.

Counter-clockwise movement of the lever 87 rocks the yoke arm 76 counter-clockwise to normal, retracting the tined pawl 78.

Means is provided, and is differentially set by movement of the lever 31 to one of its positions, to determine which of the counters is or are to be actuated during the operation of the machine.

A counter selecting drum 107 (Figs. 1, 2 and 3) is secured to a tube 108, this tube being the outer one of a group of nested tubes 109, the purpose of said tubes being to communicate the setting of the several differentials (not shown) to type elements (also not shown) to correspondingly set said elements. A gear 110 (Figs. 2 and 3) also fast on the tube 108, meshes with the segment 33, thus communicating the differential setting of the lever 31 to the selecting drum 107 and to the associated type elements (not shown).

The periphery of the selecting drum 107 is provided with a plurality of rows of control points comprising radial holes 111 and unbroken surfaces of said periphery. The holes 111 are arranged in three rows and are in alinement with the plungers 102 for the three counters on the right (Fig. 3). The plunger 112 for the customer's counter, that is, the left-hand one (Fig. 3) of said counters, does not coact with the control points on the drum 107. Downward movement of this plunger is always obstructed by a plug 114 set in the block 103, consequently the "Customer" counter is operated at each operation of the machine.

Referring to Fig. 1, it can be seen that if the hole 111 is registered with one of the plungers, and the lever 87 is rocked clockwise, the reduced end 113 of the plunger 102 is free to enter the hole, thus permitting the plunger to move downwardly as the lever 87 rocks to straighten the toggle links 100 and 101. In this case the counter is not operated, since the movement of the lever 87 is absorbed by the unobstructed downward movement of the plunger 102. However, if an unbroken point on the periphery of the drum 107 is positioned opposite the plunger 102, the downward movement of the plunger is obstructed. Now, when the lever 87 rocks to straighten the toggle links 100 and 101, the bell crank 104 is rocked counterclockwise, thus moving the pawl 78 to operate the counter associated therewith.

Thus, in order that one or more of the counters may be operated, it is only necessary to present an unbroken periphery of the drum 107 to the plunger or plungers for said counters, and likewise to throw off, or prevent operation of one or more of the counters, a hole 111 is provided in each of those positions at which it is desired to disable the counters.

By extending the drum 107 it is obvious that additional counters may be selected. For instance, a counter may be provided for each position of the lever 31, and any one or any number of said counters may be selected for operation at any position of the lever by providing the necessary control points.

Likewise, it is obvious that a bank or row of keys may displace the lever 31 differentially to control the setting of the segments 33 without departing from the spirit of the invention.

As is well known in the art, the counters may be set to zero simultaneously by rotating the shaft 70, the common method of so resetting the counter wheels to zero being to provide a notch in the shaft 70, which notch, as the shaft rotates, picks up a series of pawls (not shown), one on each of the counter wheels, and rotates the wheels to zero therewith.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed, is:

1. In a machine of the class described, the combination of a plurality of step-by-step counters; an actuator for each counter; a toggle device connected to each actuator, each of said toggle devices being normally in an unstraightened position; a plunger connected to each of the toggle devices; common means operable to simultaneously straighten all of said toggle devices to operate the special counter actuators; and a differentially adjustable member having a plurality of radial apertures to select only one of the special counters for operation upon the straightening of the toggle devices by said common means.

2. In a machine of the class described, the combination of a plurality of counters; an actuator for each counter; a toggle device connected to each actuator; common means for actuating simultaneously all of the toggle devices to operate the actuators; a slidable member connected to each of the toggle devices; and a differentially adjustable device having apertures certain of which are adapted to be brought into register with said slidable members to prevent operation of the associated counters upon actuation of the toggle devices by the common means.

3. In a machine of the class described, the combination of a plurality of counters; an actuator for each counter; a toggle device connected to each actuator; a slidable member connected to each toggle; common means to actuate all the toggle devices simultaneously to operate all of said members; a differentially rotatable member having control points consisting of apertures and unbroken sections of the periphery of the same; and a manipulative device to differentially rotate said rotatable member to selectively prevent movement of one of said sliding members whereby its associated counter is operated by its actuator upon movement of the operating means for the toggle devices.

4. In a machine of the class described, the combination of a step-by-step counter including a driving element, a plunger, a pair of toggle links one of said links being connected to the driving element of the counter and the other of said links being connected to the plunger, rotatable means having openings arranged differentially therein to selectively allow movement of the plunger, and means differentially to rotate said rotatable means.

5. In a machine of the class described; the combination of a step-by-step counter; means to actuate the counter; a bell crank connected to the actuating means; and a pair of toggle links normally in an unstraightened position, one of said links being connected to the bell crank; of a plunger connected to the other link; means connected to the toggle links to straighten the same; rotatable means having apertures, to coact with the plunger to selectively obstruct or allow movement of the plunger upon the straightening of the toggle links; and means differentially to rotate said rotatable means.

CARL G. FALKNER.